Patented Aug. 16, 1927.

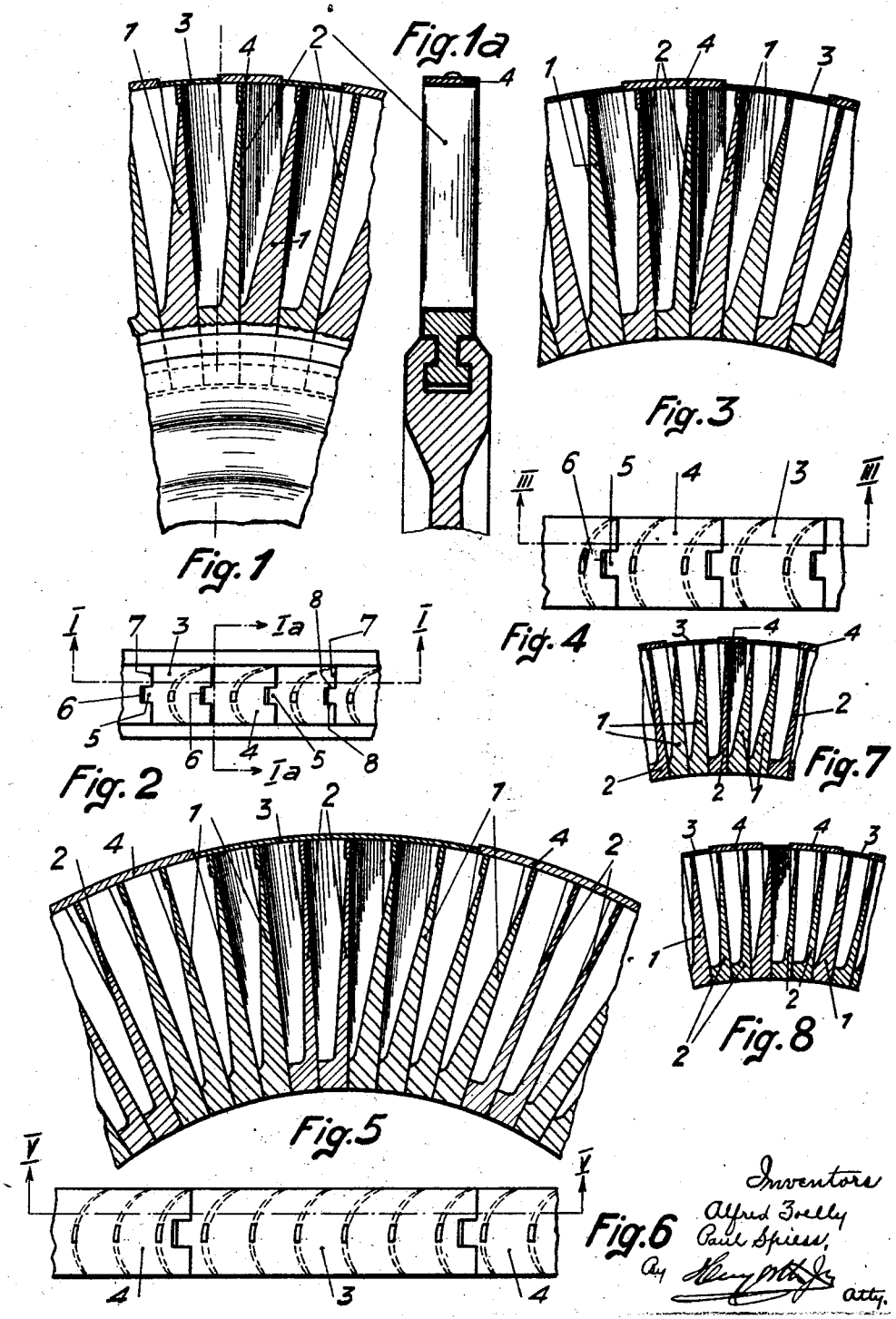

1,639,247

UNITED STATES PATENT OFFICE.

ALFRED ZOELLY AND PAUL SPIESS, OF ZURICH, SWITZERLAND.

ROTOR BLADING FOR ROTARY ENGINES, PARTICULARLY FOR STEAM TURBINES AND GAS TURBINES.

Application filed May 27, 1926, Serial No. 112,097, and in Switzerland May 28, 1925.

This invention relates to a rotor blading for rotary engines and particularly for steam turbines and gas turbines. It is known that under certain conditions with such bladings dangerous stresses in the blades and in the shroudings may occur on account of natural vibrations of the blades. Such natural vibrations have repeatedly been the cause of violent destructions. In order to obviate this danger the blading according to the present invention comprises at least two forms of blades having different frequencies of natural vibration whereby the blades of different frequencies of natural vibration disturb each other so that a resultant frequency of the natural vibration of the blading is obtained, which, at practically normal speed of the engine, has no longer any dangerous effect on the strength of the blades.

Constructional examples of the subject matter of the present invention are illustrated on the accompanying drawings in which:

Fig. 1 is a section along line I—I in Fig. 2 through a portion of a rotor blade rim having two different forms of blades.

Fig 1ᵃ is a radial section along line Iᵃ—Iᵃ in Fig. 2,

Fig. 2 is a plan view of Fig. 1,

Fig. 3 is a section along line III—III in Fig. 4 through a rotor blade rim in which groups consisting of two blades having one determined form alternate with groups consisting of two blades having a second form, and Fig. 4 is a plan-view of Fig. 3.

Fig. 5 is a section along line V—V in Fig. 6, through a blade rim with which groups of blades of different shape and having a weak shrouding alternate with groups of blades of different shape and having a strong shrouding.

Fig. 6 is a plan view of Fig. 5.

Figs. 7 and 8 are sections through blade rims with modified groups of blades.

The rotor blading illustrated in Figs. 1, 1ᵃ and 2 comprises blades 1 having a large taper and blades 2 having a small taper. The blades 1 are provided with a weak shrouding 3 and the blades 2 with a strong shrouding 4. As is shown in the drawings the blades 1 having a large taper and a weak shrouding 3 alternate in the blading with the blades 2 having a small taper and a strong shrouding 4. The shrouding of one form of blades interengages the adjacent shrouding of the other form of blades by means of a spigot 5 on one shrouding entering a notch 6 on the adjacent shrouding (Fig. 2). The blades 1 and 2 have thus different frequencies of natural vibration. The fact that the shrouding of adjacent blades 1 and 2 interengage by means of a spigot and notch causes these blades to disturb each other so that a resultant frequency of natural vibrations of the blading is obtained which, at practically normal speed of the engine, has no longer any dangerous effect on the strength of the blading. The facings 7 (see Fig. 2) cause the disturbing of the natural vibrations of the blades 1 and 2 which occur in the circumferential direction of the rotor blade rim, whilst the facings 8 disturb the natural vibrations of the blades 1 and 2 occurring in the direction at right angles to the circumference of the rotor blade rim.

With the arrangement illustrated in Figs. 3 and 4 groups consisting of two blades 1 having a large taper and a weak shrouding 3 alternate with groups of two blades 2 having a small taper and a strong shrouding 4. The shroudings 3 and 4 respectively interengage also in this case by means of spigot 5 and notch 6.

The groups of blades arranged circumferentially one after the other may comprise any number of blades having the same frequency of natural vibrations.

As is shown in Figs. 5 and 6 every group having a strong shrouding 4 as well as every group having a weak shrouding 3 may be composed of a number of blades 1 having a large taper and of a number of blades 2 having a small taper.

As is shown in Fig. 7 groups comprising at least two blades 1 having a large taper and a weak shrouding 3 may alternate with only one blade 2 having a small taper and a strong shrouding 4 or, as is shown in Fig. 8, only one blade 1 having a large taper and a weak shrouding may alternate with a group comprising at least two blades 2 having a small taper and a strong shrouding 4.

Finally it may be mentioned that it is within the scope of the invention to obtain the mutual disturbing of the different frequencies of natural vibrations also in another manner than by means of a spigot of one shrouding engaging a notch of the adjacent shrouding.

It will, of course, be obvious that the disturbing or interfering frequencies of two blades or groups of blades or a single blade and a group of blades will produce in them resulting frequencies of vibration that are less than their natural frequencies of vibration.

We claim:

1. Rotor blading for rotary engines, particularly for steam and gas turbines, comprising at least two forms of blades having different frequencies of natural vibration and means to produce a resultant frequency of the blades which at practically normal speeds has no dangerous effect on the blading.

2. A rotor blading for rotary engines and particularly for steam-turbines and gas-turbines, comprising blades having a large taper, blades having a small taper alternately arranged with blades having a large taper, a weak shrouding connected to the blades having a large taper, a strong shrouding connected to the blades having a small taper, and an interconnection between adjacent shroudings.

3. A rotor blading for rotary engines and particularly for steam-turbines and gas-turbines, comprising groups of two blades having a large taper, groups of two blades having a small taper alternately arranged with the groups of blades having a large taper, weak shroudings connecting the blades of the groups of blades having a large taper, strong shroudings connecting the blades of the groups of blades having a small taper, and an interconnection between adjacent shroudings.

4. A rotor blading, for rotary engines and particularly for steam-turbines and gas-turbines, comprising groups of two blades having a large taper, groups of two blades having a small taper alternately arranged with the groups of blades having a large taper, weak shroudings connecting the blades of the groups of blades having a large taper, strong shroudings connecting the blades of the groups of blades having a small taper, and a spigot on one shrouding engaging a notch on the adjacent shrouding.

5. A rotor blading for rotary engines and particularly for steam-turbines and gas-turbines, comprising at least two forms of blades having different frequencies of natural vibration with engaging shroudings connected to the blades, the shrouding connected to one form of blades being different in thickness from the shrouding connected to the other form of blades, said shroudings causing the blades of different frequencies of natural vibration to disturb each other.

6. The art of counteracting the dangerous effect of vibration of rotor blades of gas and steam turbines, which comprises forming the blades with interfering vibration frequencies, assembling the blades to combine such frequencies into resultant vibration frequencies less than the natural frequencies of the respective blades and which have no deleterious effect upon the blades.

7. The art of counteracting the dangerous effect of vibration of rotor blades of gas and steam turbines, which comprises forming the blades with interfering vibration frequencies, assembling the blades to combine such frequencies into resultant vibration frequencies less than the natural vibration frequency of the respective blades and of less amplitude than the natural amplitude of the blades so that no deleterious effect will be produced upon the blades.

In testimony whereof, we have signed our names to this specification.

ALFRED ZOELLY.
PAUL SPIESS.